United States Patent [19]

Josefsson et al.

[11] 4,385,298
[45] May 24, 1983

[54] MTI-FILTER IN A TRACKDING RADAR RECEIVER

[75] Inventors: Lars G. Josefsson, Lindome; Karl-Erik I. Oderland; Jan-Olov Winnberg, both of Mölndal, all of Sweden

[73] Assignee: Telefonaktiebolaget L M Ericsson, Stockholm, Sweden

[21] Appl. No.: 227,083

[22] PCT Filed: Apr. 23, 1980

[86] PCT No.: PCT/SE80/00123
§ 371 Date: Dec. 25, 1980
§ 102(e) Date: Dec. 23, 1980

[87] PCT Pub. No.: WO80/02327
PCT Pub. Date: Oct. 30, 1980

[30] Foreign Application Priority Data

Apr. 25, 1979 [SE] Sweden ................ 7903654

[51] Int. Cl.³ .................. G01S 13/24; G01S 13/52
[52] U.S. Cl. ..................... 343/7.7; 343/17.2 R
[58] Field of Search ................ 343/7.7, 17.2 R

[56] References Cited

U.S. PATENT DOCUMENTS

| 3,383,686 | 5/1968 | Davis et al. | 343/17.2 R X |
| 3,725,926 | 4/1973 | Ares | 343/7.7 X |
| 3,883,871 | 5/1975 | Moore | 343/17.2 R |
| 3,991,417 | 11/1976 | Levine | 343/7.7 |
| 4,117,538 | 9/1978 | Shrader et al. | 343/7.7 X |
| 4,155,088 | 5/1979 | Taylor, Jr. et al. | 343/7.7 |
| 4,206,463 | 6/1980 | Glasgow | 343/7.7 X |

Primary Examiner—T. H. Tubbesing
Attorney, Agent, or Firm—Hane, Roberts, Spiecens & Cohen

[57] ABSTRACT

An MTI-filter included in the receiver part of a tracking radar for suppressing clutter when receiving echo pulses from a certain target. The transmitting pulses of the tracking radar are transmitted in series where the carrier frequency is varied from pulse to pulse and is repeated from series to series. The MTI-filter (F) contains a number of delay links (DL1-DLN), for example digital shift registers which are stepped forward timely with the radar PRF. The input of the filter and the output of the shift register M≦N are connected to a differentiator (SK) where M=the number of carrier frequencies in a pulse series.

1 Claim, 4 Drawing Figures

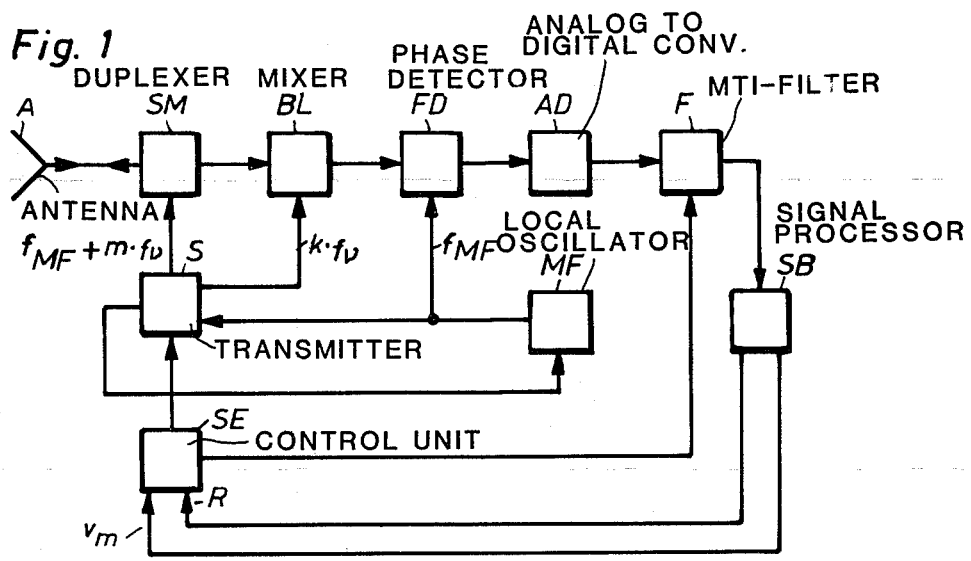
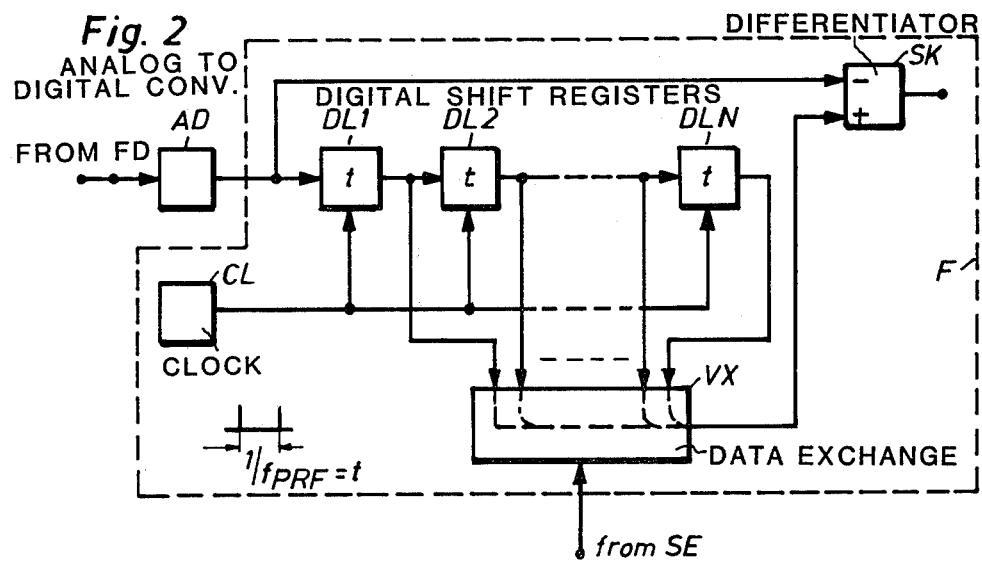

MTI-FILTER IN A TRACKING RADAR RECEIVER

FIELD OF THE INVENTION

The invention relates to a MTI-filter included in the receiver of a tracking radar for suppressing clutter when receiving echo pulses from a target intended to be tracked by the radar.

BACKGROUND OF THE INVENTION

In the U.S. patent application Ser. No. 06/227,081 a method and apparatus in a tracking radar is described for transmitting radar pulses whose carrier frequency varies from one transmitted pulse to the next following, a number M of such pulses forming a series of pulses having the time length $1/f_{FRF}$, where $f_{FRF}$ is, with respect to the target range R, a chosen quantity. The series of pulses is transmitted sequentially, the number M of carrier frequencies and the order of these being the same from one series to the next following provided that the target range does not exceed a certain value Rk, i.e. $R \leq Rk$. If the target range R becomes greater than Rk, a new (and lower) value of the frequency $f_{FRF}$ is chosen, so that continuously an unambigous determination of the target range can be obtained.

It is previously known in a pulse Doppler radar to suppress clutter, i.e. disturbing echoes from, for example, ground, sea or precipitation by providing so called MTI-filters (Moving Target Indication), see, for example U.S. Pat. No. 3,786,509. Such a filter consists of one or more delay links each with a delay $1/f_{PRF}$, where $f_{PRF}$ is the pulse repetition frequency of the radar, the signals from the delay links being tapped and added to form an output signal which constitutes the filtered input signal. Such filters show a periodic filter characteristic with a pass band between the so called blind speeds, i.e. for the speeds at which a certain suppression is obtained in addition to the desired suppression of the clutter. The blind speeds then coincide with the speeds whose resulting multiples of Doppler frequency constitute the pulse repetition frequency $f_{PRF}$.

SUMMARY OF THE INVENTION

It is an object of a tracking radar to be able to combine MTI-filtering and frequency change from pulse to pulse according to the method described in the above mentioned U.S. patent application. By means of the filter according to the present invention applied in a search radar of the kind mentioned in the introduction, an MTI-function combined with such a frequency change be attained. Furthermore, the filter response, i.e. the filter amplification as a function of the Doppler frequency of received target echoes, can be adapted to the velocity of the followed target so that the filter response becomes periodic with a period corresponding to the frequency repetition frequency $f_{FRF}$ of the transmitted series of radar pulses and not to the pulse repetition frequency $f_{PRF}$ of the radar.

An object of the present invention is thus to provide an MTI-function for a tracking radar in which the carrier frequency of the transmitted radar pulses changes from one pulse to another but in which the same carrier frequency returns from one pulse series to another, a filtering of incoming disturbing echoes being attained at the same time as the sensitivity when receiving the target echo is optimized.

BRIEF DESCRIPTION OF THE DRAWINGS

The invention will be more fully described with reference to the accompanying drawings in which:

FIG. 1 shows a block diagram of the transmitter-receiver part of a tracking radar;

FIG. 2 shows a block diagram of an MTI-filter included in the receiver part according to FIG. 1.

PREFERRED EMBODIMENTS

Figure 3:
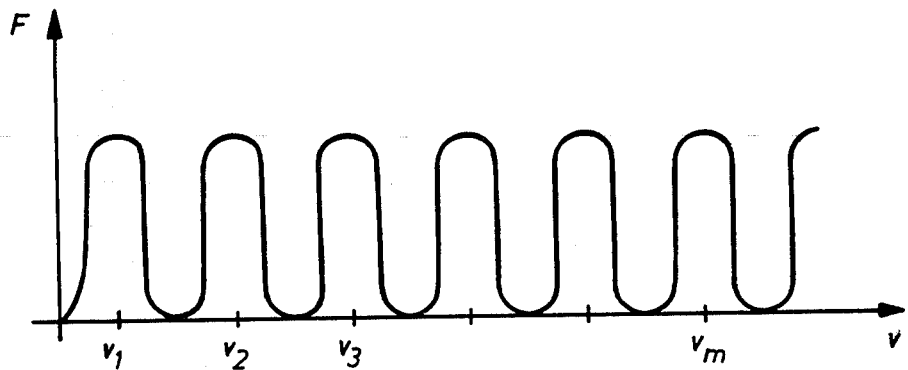
FIG. 3 shows a diagram of the characteristic of the filter according to the invention.

The transmitter-receiver units of a tracking radar using the method mentioned in the introduction are shown in FIG. 1. To the radar antenna A a duplexer SM is connected to transmit radar pulses from a transmitter unit S with the frequency $m \cdot f\nu + f_{MF}$, where $m \cdot f\nu$ indicates the carrier frequency of the radar pulses ($\nu$=const., m=1, 2, ... M) and $f_{MF}$ is a chosen intermediate frequency generated by oscillator MF. A control unit SE is connected to the transmitter unit S to give information about the chosen number of carrier frequencies M in a series of pulses $m \cdot f\nu$. The receiver side comprises a mixer BL connected to the output of the duplexer SM, a phase detector FD connected to the output of the mixer, an analog-digital converter AD connected to the output of the phase detector FD and an MTI-filter F according to the invention connected to the output of the analog-digital converter. Furthermore, there is a signal processor SB connected to the output of the filter F to calculate the target range R and the target velocity $\nu_m = dR/dt$ from the incoming and filtered target echo pulses.

The mixer BL is connected to the transmitting unit S to obtain signals with the frequency $k \cdot f\nu$, where k=1, 2, ..., M, i.e. signals with the same carrier frequency as the transmitting signals but in the order which corresponds to the carrier frequency of the received and from the duplexer delivered echo pulses. Index m and k then differ with a factor $m - k = k_o$ which corresponds to a certain target range R. The frequencies $m \cdot f\nu + f_{MF}$ are transmitted from the transmitting unit S with a pulse repetition frequency $f_{PRF}$ equal to that of the radar PRF and during a certain pulse interval $\tau$, while the frequencies $k \cdot f\nu$ are transmitted to the mixer BL during a time interval between two transmitting pulses, the so called listening interval. The received echo signal from the output of the mixer has a frequency $f_{MF}$+fd, where fd indicates the Doppler shift. The phase detector makes a phase detection relative to a reference signal $f_{MF}$, a bipolar videosignal determined by the Doppler shift fd being received across the output of the phase detector. After analog-digital conversion in the converter AD, a filtering in the filter F is carried out to eliminate the clutter and in the unit SB a calculation of the target range and velocity is carried out, whereby signals corresponding to these quantities are delivered to the control unit SE.

The MTI-filter according to the invention will now be more fully described with reference to FIG. 2. The filter contains a number N of delay links DL1, ..., DLN, for example, digital shift registers which are connected in cascade. Each shift register has a clock input connected to a common clock CL which delivers clock signals in the form of short pulses with the repetition frequency $f_{PRF}$. The clock pulses are, in addition, in known manner synchronized with the transmitting pulses from the transmitter unit S. A differentiator (digital subtractor) has one input (−) connected to the input of the first register DL1 and with its second input (+) connected to the output of a controllable switching device VX, a so called data exchange. The switching device VX has N inputs connected to the outputs of all the registers and has the task of connecting the output of a determined register DLN to the input (+) of the differentiator SK in dependence on the chosen number of carrier frequencies M. The switching device is therefore controlled from the control unit SE, which delivers an information signal indicating the chosen value of M. If, for example, 10 different carrier frequencies M=10 have been chosen, the output of the tenth delay link (shift register no 10) should be connected to the second input (+) of the differentiator via the switching device VX. The MTI-filter according to FIG. 2 thus consists of a simple forward connected digital filter with a delay in one signal direction equal to $1/f_{FRF}$.

FIG. 3 shows a diagram of the filter amplification as a function of the Doppler frequency fd of incoming target echo signals. Since the Doppler shift fd is dependent on the carrier frequency $m \cdot fv$ of the transmitted pulses and since the frequency $m \cdot fv$ varies from one pulse to another, one starts when determining a suitable frequency repetition frequency $f_{FRF}$ from a mean value $m_o \cdot fv$ of the carrier frequency for a certain transmitted series of pulses, i.e. $m_o \cdot fv = (1/M)(fv + 2\ fv + \ldots + Mfv)$, where $fv, 2\ fv, \ldots, Mfv$ are the carrier frequencies of the actual transmitted series of pulses.

The MTI-filter according to FIG. 2 has an amplification maximum at the velocities $$v_n = \frac{c \cdot f_{FRF}}{2m_o \cdot fv} (n + \tfrac{1}{2}), n = 0, 1, 2, \ldots$$

where $m_o \cdot fv$ is the chosen average frequency (known). The frequency $f_{FRF}$ should therefore be chosen according to $$f_{FRF} = 2m_o \cdot fv\ v_m/c \cdot \left(\frac{f_{FRF1}}{n + \tfrac{1}{2}}\right)$$

at a certain radial target velocity $v_m$ and average carrier frequency $m_o \cdot fv$. In order to get the greatest possible rejection bandwidth, the highest possible value of $f_{FRF}$ should be chosen. In the diagram according to FIG. 3, the full drawn line shows the characteristic of the MTI-filter for a certain determined value of the target velocity $v_m$ and the frequency repetition frequency $f_{FRF}$. The filter characteristic can in known manner be modified by connecting several filters in cascade, each having a design similar to that of FIG. 2, whereby a steeper transition between the pass- and the rejection band can be attained.

Figure 4:
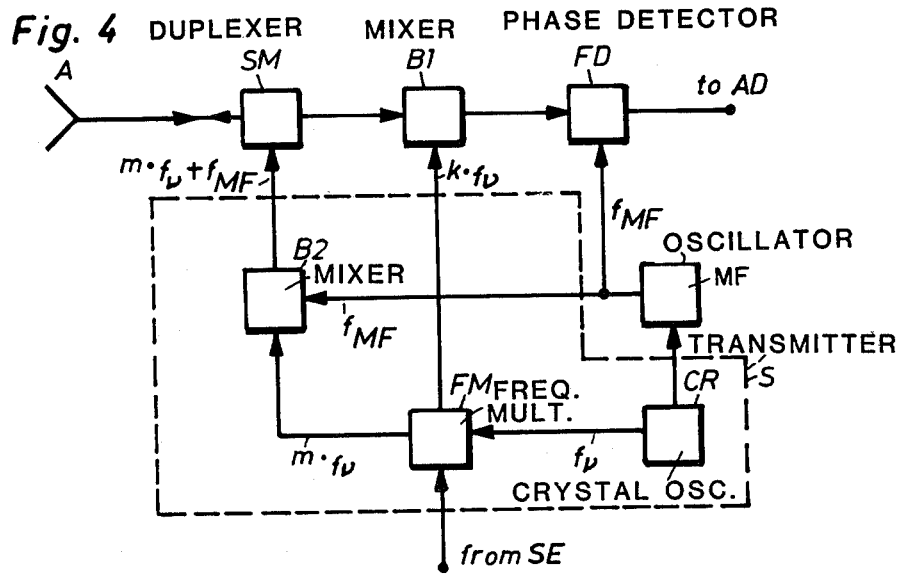
FIG. 4 shows closely the design of certain blocks in the diagram according to FIG. 1.

The signal treatment in the receiver part and in the MTI-filter presupposes a coherent detection of the incoming echo signals, i.e. phase equality between the carrier frequency signals of the transmitting pulses and the signals produced in the receiver part. This can be carried out as it appears from the block diagram of FIG. 4 which shows more closely the transmitting part S. A crystal CR generates a certain selected high frequency signal with the frequency $fv$, for example 100 MHz. The crystal CR is connected to a controllable coherent frequency multiplier FM, for example, a VCO (Voltage Controlled Oscillator) for producing the M pulsed signals with the carrier frequencies $m \cdot fv$ ($m = 1, 2, \ldots, M$) to a mixer B2 and the M signals with the carrier frequencies $k \cdot fv$ which during each listening interval are transmitted to the mixer B1. The frequency multiplier is controlled from the control unit SE so that the frequency of the signal obtained from the crystal CR is multiplied with selected factors $1, 2, \ldots, M$. The multiplier contains, furthermore, a phase locked loop which carries out a control of the phase position of a signal with the frequency $m \cdot fv$ so that this position will be the same each time the multiplier is locked to this frequency.

According to FIG. 1, the signal treatment unit calculates the target range R and the target velocity $v_m$, for example, by forming the difference of two consecutive target range values. The corresponding signals are delivered to the control unit SE which calculates a value of the frequency repetition frequency $f_{FRF}$ according to the relation $f_{FRF} = 2fv/c \cdot v_m/{n+\tfrac{1}{2}}$ and for a certain n (for example n=1). The calculated value of $f_{FRF}$ should at the same time fulfil the relations (1), (2) and (3) in the U.S. patent application mentioned in the introduction. If these conditions then cannot be fulfilled, the next lower value of $f_{FRF}$ is chosen (i.e. for n=2, 3 etc. according to the example) until the conditions are fulfilled. As a result a certain value of the number M of the carrier frequencies $m \cdot fv$, $k \cdot fv$ is obtained and the control unit delivers signals with M voltage levels in time with the chosen pulse repetition frequency $f_{PRF}$. The M voltage levels are received by the controllable coherent frequency multiplier FM, a rough adjustment to the chosen frequencies M being carried out. After that a fine adjustment of the frequency of the multiplied signals is carried out to attain phase equality from a multiplied signal to the next following etc. as described above.

We claim:

1. In a receiver unit of a tracking radar whose transmitting unit transmits series of M radar pulses having a given pulse repetition frequency $f_{PRF}$ wherein each pulse in the series has a different carrier frequency and the series are repeated with a given frequency repetition frequency $f_{FRF}$ which is a function of the range of the target being tracked, a MTI-filter comprising: means for processing the received echo pulses to analog pulse signals; analog to digital conversion means for converting the analog pulse signals to digital values represented by coded combinations of pulse signals; digital filtering means including a plurality of serially connected digital delay means each having a delay equal to $1/f_{PRF}$ and corresponding to the number of carrier frequencies used by the transmitting unit when transmitting; a digital differentiator means having a first input connected to the output of the analog to digital converter means, a second input and an output which is the output of the MTI-filter; controllable switching means having a plurality of inputs each connected to an output of a different one of digital delay means and an output connected to the second input of said digital differentiator means for connecting the output of a selected one of said digital delay means to the digital differentiator in accordance with the number of radar pulses in the transmitted series.

* * * * *